United States Patent
Ciller Ruiz et al.

(10) Patent No.: US 11,170,258 B2
(45) Date of Patent: Nov. 9, 2021

(54) REDUCING NOISE IN AN IMAGE

(71) Applicant: RetinAl Medical AG, Bern (CH)

(72) Inventors: Carlos Ciller Ruiz, Pully (CH); Sandro de Zanet, Fribourg (CH); Stefanos Apostolopoulos, Ostermundigen (CH)

(73) Assignee: RetinAl Medical AG, Bern (CH)

( * ) Notice: Subject to any disclaimer, the term of this patent is extended or adjusted under 35 U.S.C. 154(b) by 51 days.

(21) Appl. No.: 16/614,391

(22) PCT Filed: May 16, 2018

(86) PCT No.: PCT/EP2018/062824
§ 371 (c)(1),
(2) Date: Nov. 18, 2019

(87) PCT Pub. No.: WO2018/210978
PCT Pub. Date: Nov. 22, 2018

(65) Prior Publication Data
US 2020/0234080 A1      Jul. 23, 2020

(30) Foreign Application Priority Data

May 19, 2017   (EP) .................................... 17172039

(51) Int. Cl.
*G06K 9/62*     (2006.01)
*G06T 7/70*     (2017.01)
(Continued)

(52) U.S. Cl.
CPC ......... *G06K 9/6256* (2013.01); *G06K 9/6262* (2013.01); *G06N 3/04* (2013.01);
(Continued)

(58) Field of Classification Search
None
See application file for complete search history.

(56) References Cited

U.S. PATENT DOCUMENTS

| | | | |
|---|---|---|---|
| 10,169,864 B1* | 1/2019 | Bagherinia | G06K 9/4604 |
| 2013/0051516 A1 | 2/2013 | Yang et al. | |
| 2013/0156297 A1* | 6/2013 | Shotton | G06K 9/6255 |
| | | | 382/159 |

OTHER PUBLICATIONS

Ronneberger et al.; "U-Net: Convolutional Networks for Biomedical Image Segmentation", Computer Science Department and BIOSS Centre for Biological Signalling Studies, University of Freiburg, Germany, 2015, DOI 10.1007/978-3-319-24574-4_28.
(Continued)

*Primary Examiner* — Leon Flores
(74) *Attorney, Agent, or Firm* — N.V. Nederlandsch Octrooibureau; Catherine A. Shultz; Katelyn J. Bernier

(57) ABSTRACT

A method of training a neural network for reducing noise in an image comprises obtaining a plurality of input images from an imaging device. The method comprises generating a plurality of target images by combining a subset of the input images that each depict a same object, to reduce a noise of the target image. The method comprises generating a plurality of training pairs, wherein a training pair comprises one of the target images and a training image based on at least one but not all of the input images of the subset of input images corresponding to the one of the target image. The method comprises training a neural network using the plurality of training pairs.

12 Claims, 6 Drawing Sheets

(51) Int. Cl.
- G06N 3/04 (2006.01)
- G06N 3/08 (2006.01)
- G06T 3/60 (2006.01)
- G06T 5/00 (2006.01)
- G06T 5/50 (2006.01)
- G06T 11/00 (2006.01)

(52) U.S. Cl.
CPC .......... *G06N 3/08* (2013.01); *G06T 3/60* (2013.01); *G06T 5/002* (2013.01); *G06T 5/50* (2013.01); *G06T 7/70* (2017.01); *G06T 11/008* (2013.01); *G06T 2207/10101* (2013.01); *G06T 2207/20081* (2013.01); *G06T 2207/20084* (2013.01)

(56) References Cited

OTHER PUBLICATIONS

He et al., Microsoft Research, "Deep Residual Learning for Image Recognition", arXiv:1512.03385v1 [cs.CV] Dec. 10, 2015.

Devi et al., "Noise Reduction Models in Neural Networks: A Review", International Journal of Advanced Research in Computer Science and Software Engineering, Research Paper, vol. 5, Issue 1, Jan. 2015, Available online at: www.ijarcsse.com, ISSN: 2277 128X.

Apostolopoulos et al., "RetiNet: Automatic AMD identification in OCT volumetric data", arXiv:1610.03628v1 [cs.CV] Oct. 12, 2016.

Ronneberger et al.; "U-Net: Convolutional Networks for Biomedical Image Segmentation", Computer Science Department and BIOSS Centre for Biological Signalling Studies,University of Freiburg, Germany, arXiv:1505.04597v1 [cs.CV] May 18, 2015.

Avanaki et al., "Denoising based on noise parameter estimation in speckled OCT images using neural network", 1st Canterbury Workshop on Optical Coherence Tomography and Adaptive Optics edited by Adrian Podoleanu, Proc. of SPIE vol. 7139, 71390E • © 2008 SPIE CCC code: 0277-786X/08/$18 • doi: 10.1117/12.814937.

Avanaki et al., "Speckle reduction using an artificial neural network algorithm", 1559-128X/13/215050-08$15.00/0 © 2013 Optical Society of America, Applied Optics / vol. 52, No. 21 / Jul. 20, 2013.

Avanaki et al., "A new algorithm for speckle reduction of optical coherence tomography images", Proc. SPIE 8934, Optical Coherence Tomography and Coherence Domain Optical Methods in Biomedicine XVIII, 893437 (Mar. 4, 2014); doi:10.1117/12.2041943.

Lubna Badri, "Development of Neural Networks for Noise Reduction", Faculty of Engineering, Philadelphia University, Jordan, The International Arab Journal of Information Techology, vol. 7, No. 3, Jul. 2010.

Park et al., "Reduced Speckle noise on Medical Ultrasound Images Using Cellular Neural Network", Published in: Engineering in Medicine and Biology Society, 2007. EMBS 2007. 29th Annual International Conference of the IEEE, DOI: 10.1109/IEMBS.2007.4352745.

Tafti et al., "Neural Network with Median Filter for Image Noise Reduction", 2012 International Conference on Mechatronic Systems and Materials, IERI Procedia 00 (2012) 000-000, available online at www.sciencedirect.com.

Udding et al., Speckle reduction and deblurring of ultrasound images using artificial neural network, Published in: Picture Coding Symposium (PCS), 2015, DOI: 10.1109/PCS.2015.7170056.

Touch et al., "A neural network-based method for spectral distortion correction in photon counting x-ray CT", Institute of Physics and Engineering in Medicine, Phys. Med. Biol. 61 (2016) 6132-6153, doi:10.1088/0031-9155/61/16/6132.

* cited by examiner

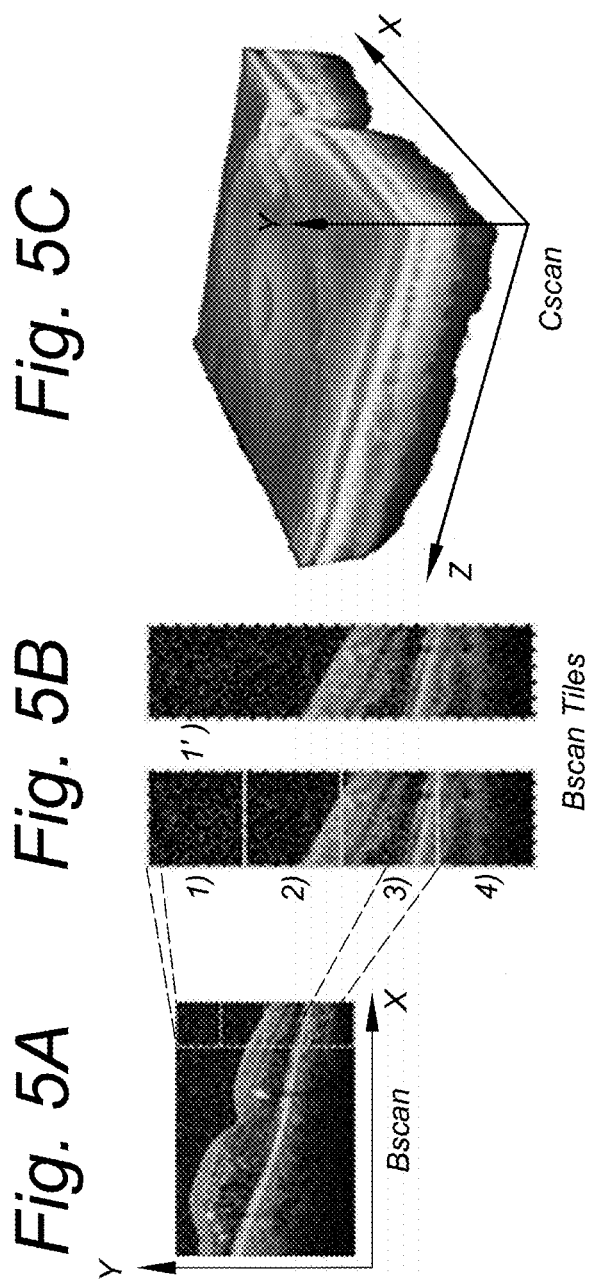

REDUCING NOISE IN AN IMAGE

FIELD OF THE INVENTION

The invention relates to method and apparatus for reducing noise, in particular speckle noise, in images. More particularly, the invention relates to reducing speckle noise in OCT images.

BACKGROUND OF THE INVENTION

Imaging devices typically can generate digital images based on signals received from one or more sensors. The generated images contain noise. Much research has been conducted in the past to reduce the noise in the generated images.

Optical Coherence Tomography (OCT) is a non-invasive imaging modality that provides micrometer-resolution, multi-dimensional images of biological tissue and other samples. In the most common configuration, OCT images are formed through the interference of two wide-bandwidth laser beams: one reflected off a static mirror ("reference beam") and one reflected off the sample under investigation ("sample beam"). In OCT-terminology, an A-scan refers to a single column acquired by a static sample beam; a B-scan refers to a 2-dimensional cross-sectional image acquired by the sample beam moving along a line with respect to the sample; and a C-scan refers to a 3-dimensional volumetric image acquired by the sample beam moving with respect to the sample in an application-specific raster pattern.

Despite significant advances in technology, OCT images still suffer from speckle noise. Speckle noise may be caused by a complex combination of thermal, electrical, multiple-scattering effects, as well as digital processing algorithms. Indeed, in many applications, 75% of the spectral energy of the reconstructed OCT signal is noise.

As such, speckle reduction or denoising techniques are a matter of intense research. The first and simplest approach involves the averaging of multiple B-scans acquired from the same sample location. Since speckle noise is the result of random processes, and is hence decorrelated, averaging n B-scans results in an improvement of the Signal-to-Noise Ratio (SNR) by a factor of $\sqrt{n}$. Averaging is typically performed in the final reconstructed image, rather than the interference signal.

Digital noise removal algorithms attempt to post-process acquired images to reduce the amount of speckle noise without harming the structural information contained therein. Examples of such methods include median filtering and other isotropic and anisotropic smoothing techniques.

A speckle noise reduction method using an artificial neural network algorithm is disclosed in "Speckle reduction using an artificial neural network algorithm", by M. R. N. Avanaki et al., Applied Optics, Vol. 52, No. 21, 2013. To train the ANN, noisy images with known sigma values are needed. A Rayleigh noise generator is used to produce noisy images with known sigma values.

SUMMARY OF THE INVENTION

It would be advantageous to provide an improved method to reduce noise of images obtained via a measurement technique.

To address this concern, an aspect of the invention provides a method of training a neural network for reducing noise in an image, comprising obtaining a plurality of input images from an imaging device;

identifying subsets of the input images, wherein each input image of a subset of input images depicts a same object as the other input images of that subset;

generating a plurality of target images, wherein a target image is generated by combining the input images of one of the subsets, to reduce a noise;

generating a plurality of training pairs, wherein a training pair comprises
  one of the target images, and
  a training image based on at least one but not all of the input images of the subset corresponding to said one of the target images; and training a neural network using the plurality of training pairs.

The neural network thus trained is capable to reduce the noise, because it can map a noisy image to a corresponding noise-reduced image. Because the neural network is trained using the training images that are based on images actually created by the imaging device and target images that are noise-reduced versions thereof, the neural network can learn the particularities of the imaging device and the noise it generates and remove the detected noise accordingly. When using the techniques disclosed herein, it is not necessary establish the details (such as a standard deviation) of the generated noise beforehand, because the training images inherently represent the relevant noise.

If the training image is based on more than one input image, the training image may be generated by combining said more than one but not all of the input images of the subset of input images to reduce noise of the training image. This allows the network to learn from pairs that have a training image that contains partially-reduced noise. Surprisingly, this approach leads to improved result of the neural network training.

The step of generating the plurality of training images may comprise generating training images based on different numbers of input images, by combining the different numbers of input images to obtain the training images.

The plurality of training pairs may comprise a first training pair comprising a first training image that is based on a first number $K_1$ of input images, and a second training pair comprising a second training image that is based on a second number $K_2$ of input images, wherein the first number $K_1$ is different from the second number $K_2$. This variable number of images that is combined leads to variable levels of noise in the training images. The first training image will have different level of smoothing than the second training image. This leads to improved neural network training results.

The plurality of training pairs may comprise training pairs having the same target image but different training images that are based on different numbers of input images. Thus, the same target image may appear in multiple training pairs to train different levels of noise. This provides improved training result.

For each target image and its corresponding subset of N input images, training images may be generated based on K of the subset of N input images, for all positive integer values K that are smaller than N. The inventors found this may improve training results of the neural network.

For any value K, if there exist more than one possible selection of K input images from the subset of N input images, then training images may be generated for more than one selection of the K input images from the subset of N input images. The inventors found this may improve training results of the neural network.

The combining of input images may comprise averaging corresponding values of the combined input images. This is an effective way to reduce the noise in the target images and training images.

The method may comprise spatially registering the input images of a subset before generating the target image and training images. This may improve the result of combining the images.

The method may comprise augmenting the training images by adding noise or changing an orientation of the training image before training the neural network. This may improve the result of the network training.

The input images may be obtained from optical coherence tomography, OCT. The approach described in the present disclosure is specifically suitable for noise reduction in OCT imaging.

For example, the input images of a particular subset of input images are B-scan images extracted from a single C-scan image. These B-scan images of a C-scan have the advantage of being acquired with minimal amount of time in between the scans. Thus, less motion distortion may occur, which makes it easier to combine the images to reduce the noise. Furthermore, in addition to acquiring B-scans or alternatively to B-scans, it is possible to acquire M-scans. Herein, M-scans are repeated B-scans on the same spot through time. By combining the M-scans, the noise in the images may be reduced.

For example, the input images may depict at least part of a retina. The approach described in the present disclosure is specifically suitable for noise reduction in retina imaging, in particular OCT retina imaging.

The input images of different subsets may comprise images of a same type of tissue or a same type of organ in different subjects. This allows the neural network to specialize for images of a particular type of tissue or type of organ. This way, the noise may be easier to distinguish from actual features of the object itself. Similarly, the input images of different subsets may comprise images of different objects of a same type.

The obtaining the plurality of input images may comprise obtaining input images from a plurality of different imaging devices. These images may be used to create training pairs with images from different imaging devices. This may provide the neural network with the capability of device generalization. Training on training pairs with images from multiple devices may help uncover additional information in the underlying image structure. This is also the case when the different imaging devices have different capabilities. For example, adding samples from a device with better tissue penetration may enable the neural network to improve the deep-tissue quality on a device with worse tissue penetration.

After the training, the method may involve receiving a new image from an imaging device and supplying the new image as input image to the neural network and obtaining an output image from the neural network. This is a step in which the trained neural network may be applied to reduce noise in any image.

According to another aspect of the invention, a noise reduction apparatus of an imaging device is provided. The apparatus comprises
  an input unit for receiving an image from an imaging device;
  a control unit for processing the image according to a trained neural network to generate an output image; and
the neural network created by obtaining a plurality of input images from an imaging device, identifying subsets of the input images, wherein each input image of a subset of input images depicts a same object as the other input images of that subset, generating a plurality of target images wherein a target image is generated by combining the input images of one of the subsets to reduce a noise, generating a plurality of training pairs wherein a training pair comprises one of the target images and a training image based on at least one but not all of the input images of the subset corresponding to said one of the target images, and training the neural network using the plurality of training pairs.

According to another aspect of the invention, a system for training a neural network for reducing noise in an image is provided. The system comprises
  an input unit for obtaining a plurality of input images from an imaging device;
  a control unit configured to:
  identify subsets of the input images, wherein each input image of a subset of input images depicts a same object as the other input images of that subset;
  generate a plurality of target images, wherein a target image is generated by combining the input images of one of the subsets, to reduce a noise;
  generate a plurality of training pairs, wherein a training pair comprises
    one of the target images, and
    a training image based on at least one but not all of the input images of the subset corresponding to said one of the target images; and
  train a neural network using the plurality of training pairs.

The person skilled in the art will understand that the features described above may be combined in any way deemed useful. Moreover, modifications and variations described in respect of the method may likewise be applied to implement the apparatus and/or a computer program product, and modifications and variations described in respect of the apparatus may likewise be applied to the method and to the computer program product.

BRIEF DESCRIPTION OF THE DRAWINGS

In the following, aspects of the invention will be elucidated by means of examples, with reference to the drawings. The drawings are diagrammatic and may not be drawn to scale. Throughout the drawings, similar items may be denoted by the same reference numerals.

FIG. 5 shows examples of different OCT-scans and tiling thereof.

DETAILED DESCRIPTION OF EMBODIMENTS

Certain exemplary embodiments will be described in greater detail, with reference to the accompanying drawings.

The matters disclosed in the description, such as detailed construction and elements, are provided to assist in a comprehensive understanding of the exemplary embodiments. Accordingly, it is apparent that the exemplary embodiments can be carried out without those specifically defined matters. also, well-known operations or structures are not described in detail, since they would obscure the description with unnecessary detail.

According to an aspect of the present disclosure image quality may be enhanced by eliminating speckle noise without harming the structural information encoded in an OCT scan. According to the present disclosure, a neural network "learns" to distinguish the particular speckle patterns corresponding to each type of tissue from the background noise, and is able to eliminate the noise while maintaining the information about the tissue. Additionally, the solution disclosed herein may run in near real-time to reduce noise in acquired images, rendering it relevant for a clinical setting.

According to an aspect of the present disclosure, the noise reduction problem is treated as a supervised machine-learning task, wherein it is tried to learn a non-linear transformation function $f(I_N) \rightarrow I$ that maps a noisy/corrupt image $I_N$ to a denoised/clean image I.

According to an aspect of the present disclosure, a dataset is carefully prepared based on, for example, OCT images, in order to capture the necessary information for supervised training. This dataset is acquired using a specific protocol and post-processed in a specific way, so that it comprises $\{I_N,I\}$ pairs of noisy images and clean images, respectively.

It is possible to augment each $\{I_N, I\}$ pair using a wide set of mathematical transformations in order to achieve invariance to commonly-encountered image variations.

According to an aspect of the present disclosure, a high-order non-linear transformation function $f$ is determined by training a convolutional neural network on $\{I_N,I\}$ pairs until convergence.

Figure 1:
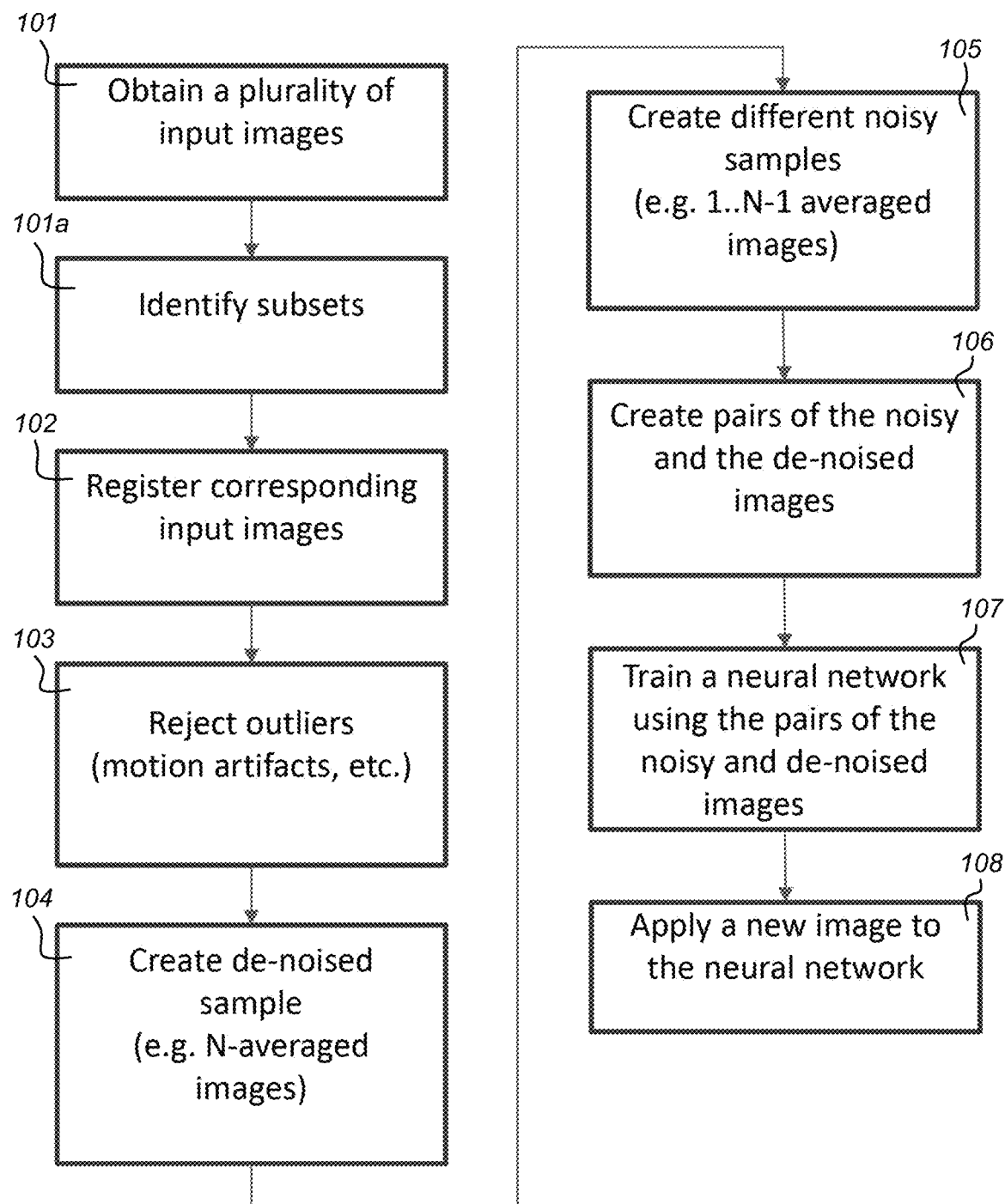
FIG. 1 shows a flowchart of a method of preparing a training dataset, training a neural network and applying the neural network.

FIG. 1 shows a block diagram of a method of training a neural network to reduce noise in an image. The training dataset is an important ingredient of successfully training a neural network. Steps 101 to 106 relate to preparing a training dataset, whereas step 107 relates to the actual training of the neural network using the prepared training dataset.

The method starts in step 101 by obtaining a plurality of input images. This step may comprise operating an image detection device to apply a sensor to measure the image data. Also, the step 101 may include performing an image reconstruction technique, such as computed tomography or a related technique, to obtain the input images. Images may be acquired of different examples of a similar type of object. For example, the retina in different subjects may be regarded similar type objects. Different retina of the same subject may also be regarded similar type objects. Moreover, images may be acquired of different portions of the same object, if these different portions have similar image characteristics. In some applications, the images need to be acquired all in the same relative position with respect to each object. In other applications, it is less important which portion of an object is imaged. This may be determined by means of trial and error.

The images may be optical coherence tomography (OCT) images. These OCT images may have been reconstructed to depict the object in its spatial domain. The object type may be the retina, for example the human retina. Retinas of a plurality of different subjects (for example, persons) may be imaged to obtain images of different subjects.

Also, the same subject may be imaged a plurality of times, with a considerable delay in between the measurements, for example to detect a progress of a disease. In such a case, these acquisitions may be considered to be images of different objects (because the object may have changed in between the acquisitions).

In step 101a, the images may also be grouped into subsets such that the images of the same object, as defined above, are grouped together in the same subset. This makes it easier to perform the next processing steps.

Other embodiments may involve for example ultrasound images or CT images instead of OCT images.

In step 102, the images of a subset of images corresponding to the same object may be registered to each other. This step may be a motion compensation step. Successive images of the same object may be taken from a slightly different position, or the object may have moved in between successive images. The registration step matches the images to each other to compensate for any such motion. This step is optional, because in certain embodiments the amount of motion can be neglected. The output of step 102 is a set of images, wherein different images of the same object are motion-compensated with respect to each other. In other words, the images in each subset are motion-compensated with respect to the other images in the subset.

In step 103, an optional step may be performed to reject outliers. If the motion compensation fails, for example, or the images within a subset differ too much after the motion compensation, the images may be discarded. Alternatively, if an image by itself has abnormal properties (too dark, unrealistic spikes, etc.), such an image may be discarded. The output of step 103 is a dataset that is both motion compensated and cleaned by discarding the outliers. It is noted that an alternative or additional outlier rejection step may be performed in between steps 101 and 102.

In step 104, improved quality images are generated from the existing images. For example, the images in each subset of images depicting the same object may be averaged or otherwise combined to obtain an improved-quality image. Since the images in each subset are motion compensated, the averaging of the images may reduce the noise while enhancing the actual tissue information. These improved quality images are denoted hereinafter as "target images".

In step 105, images with differing levels of noise are generated. This may be performed by averaging or otherwise combining varying numbers of images from each subset of images. That is, if a subset of images has N images, then the N-averaged image (the average of all the images in the subset), is the target image. However, average images of less than N images constitute training images. Any number of images K may be averaged from K=1 to K=N-1. Also, for each value of K, there are multiple possible selections of K images from the subset of N images. All these selections result in different training images. Thus, all these selections may be used to generate many training images. In certain embodiments, all values of K from 1 to N-1 are used and all possible selections of K images are used to generate as many training images as possible. Alternatively, some choice is made as to which possibilities should be actually used. For example, the number of selections for any value of K may be limited to a predetermined number of random selections. Alternatively, not every value of K is used but only certain values of K. For example, odd-values K (K=1, 3, 5, . . . , wherein K<N), or every third value of K (K=1, 4, 7, . . . , wherein K<N) may be used. Other choices for the selections of images to be combined will be apparent to the person skilled in the art. It will be noted that although the present example is detailed for averaging of images, other kinds of combinations (such as median value) are also possible for both step 104 and 105.

In a simplified version of step 105, each training image is based on at least one but not all of the input images of the subset of images. For example, only one training image could be made for each target image. Or only the single input images (K=1) may be used as training images. Thus, the different numbers of K may be omitted.

In step 106, pairs of the noisy images and the de-noised images are prepared. Each pair contains a training image and a target image. The training image and the target image of a pair are based on the same subset of images that depict an object. Since multiple target objects were created for each subset in step 105, the same target image will be included in a plurality of different pairs. These pairs are denoted hereinafter as "training pairs".

In step 107, a neural network is trained using the training pairs. To this end, any suitable neural network topology and training process may be used. The input to the neural network is a training image, and the target output is the target image corresponding to the training image. An example implementation of step 107 is shown in FIG. 2.

When the training process is completed, the neural network may be applied to reduce noise in images. To that end, when a new image is acquired, the image may be applied to the neural network, as shown in step 108. The output of the neural network may be used as the reduced-noise image.

Figure 2:
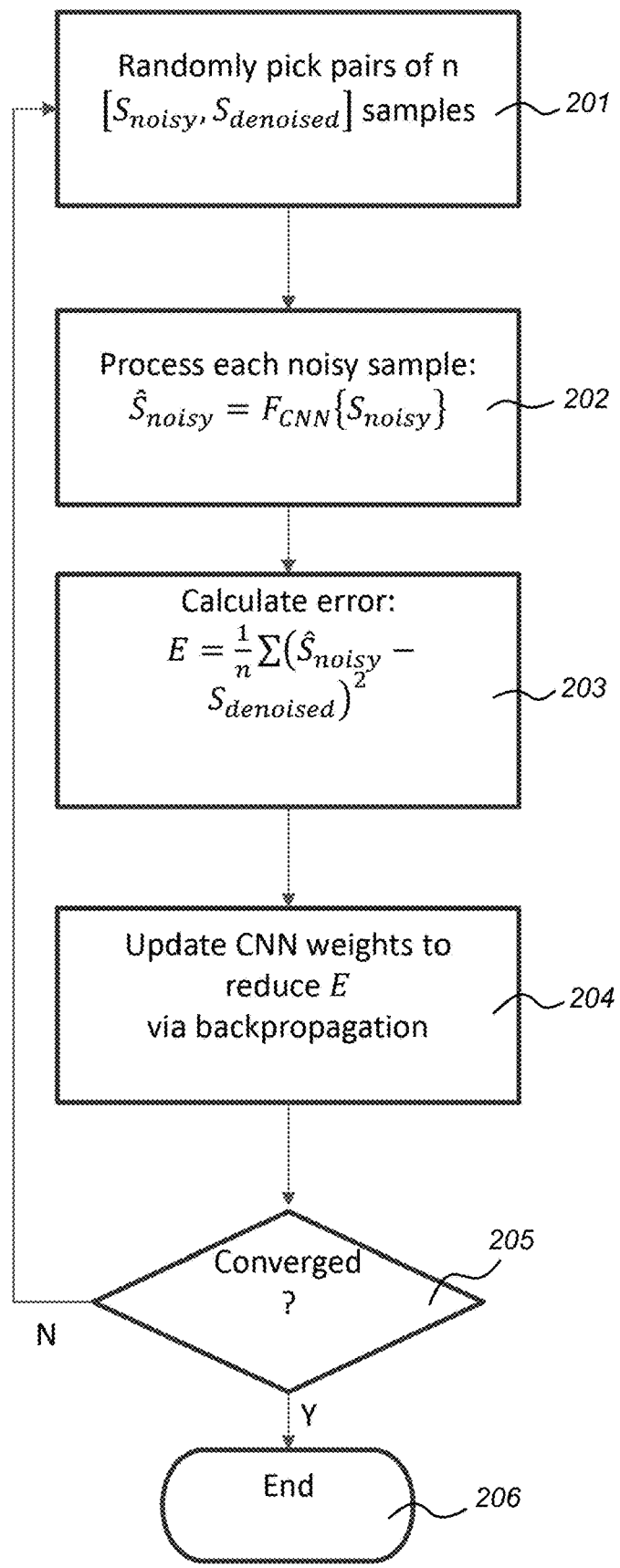
FIG. 2 shows a flowchart of a method of training a neural network.
Figure 3A:
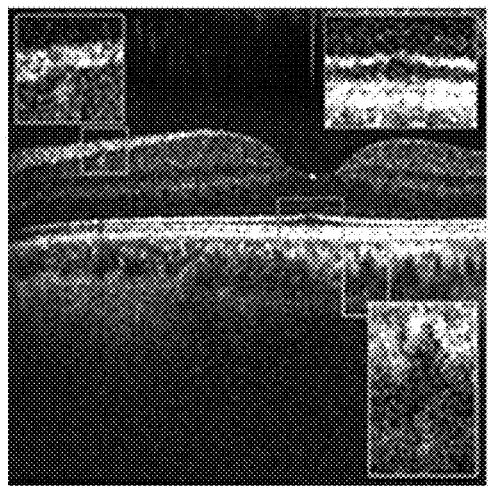
FIG. 3 shows a comparison of several denoising methods.
Figure 3B:
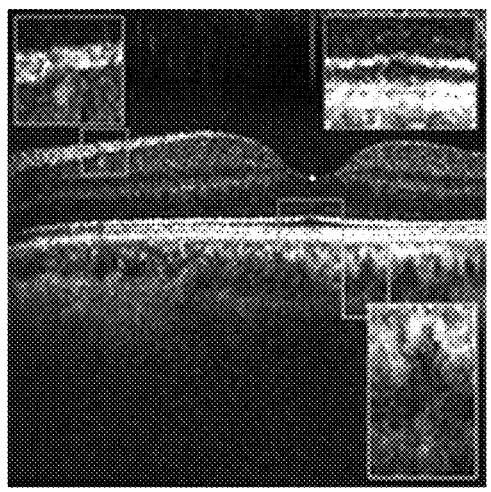
Figure 3C:
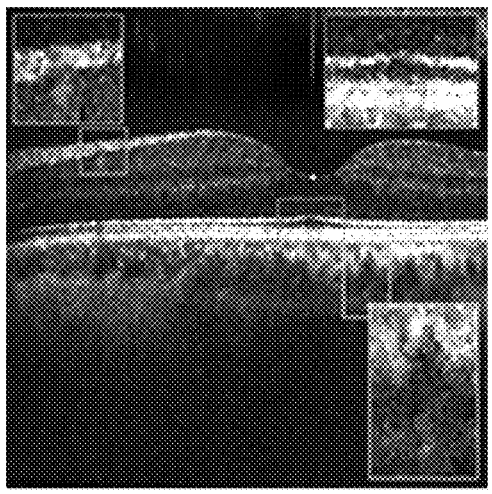
Figure 3D:
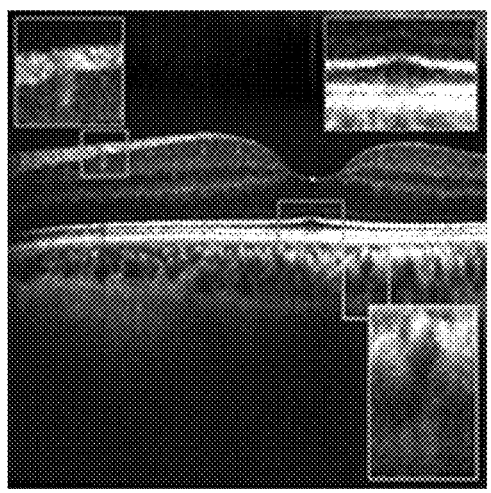
Figure 3E:
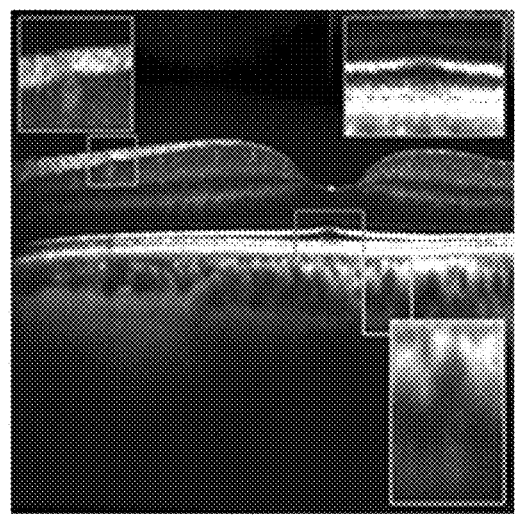

FIG. 2 illustrates a method of training a neural network using a training dataset prepared as set forth in this disclosure. It will be understood that this diagram is only provided as an illustrative example. Other schemes for training a neural network are known to the person skilled in the art and may be applied accordingly.

In step 201, n training pairs are randomly selected from the available training pairs. Each training pair comprises a noisy image $S_{noisy}$, also referred to as training image, and a de-noised image $S_{denoised}$, also referred to as target image. A suitable number n (where n is smaller than the number of available training pairs) may be determined by trial and error.

In step 202, the training images of the randomly selected training pairs are applied to the neural network. This may be represented by a formula $\hat{S}_{noisy}=F_{CNN}\{S_{noisy}\}$, wherein $F_{CNN}$ denotes the neural network. The neural network $F_{CNN}$ may be a convolutional neural network or another type of supervised-learning neural network.

In step 203, an error function is determined; each output $\hat{S}_{noisy}$ of the neural network is compared to the corresponding target image $S_{denoised}$ to determine an error. The error value may be determined, for example, as the sum of squared differences. For example for each pixel or voxel of the images a squared difference may be determined. These squared differences may be added. This process may be repeated for all of the n randomly selected images. The sum of all the squared differences may be computed and divided by n to compensate for the number of images n. This may result in the following example formula:

$$E = \frac{1}{n}\Sigma(\hat{S}_{noisy} - S_{denoised})^2,$$

wherein E is the determined error value.

In step 204, the parameters of the neural network may be adapted in such a way that the error value E is reduced. This step may be performed by a process of backpropagation, as is known in the art by itself.

In step 205, it is tested whether the process has converged. This may be performed by comparing the error value E to a predetermined threshold value. Alternatively, the speed with which E reduces may be tracked and if the speed of reduction of the error value E slows down, it may be decided that the process has converged. Alternatively, it may be decided that the process has converged after a predetermined number of iterations. If the process has not converged, the process is repeated from step 201. If the process has converged, the process ends at step 206 and the resulting neural network may be stored for future use.

At a high level, the techniques disclosed herein may allow to exploit the sparsity of OCT images, i.e. the fact that the total number of possible OCT footprints of a specific sample is much lower than the total number of possible images, in order to learn an efficient representation of the transformation function $f$. For example, OCT scans of the human retina reveal a very specific layered structure, even in the case of highly pathological eyes (i.e. the vitreous humor lies above the retina, while the choroid lies below). By training a CNN on a sufficient number of representative retinal scans, it is possible to learn a transformation function from a noisy $I_N$ scan to an underlying clean I image of the underlying structure without speckle noise or with reduced speckle noise. Since the number of possible valid $I_N$ images is lower than the number of possible noisy $I_N$ scans, this transformation function can be alternatively thought of as a compression strategy, with the compression coefficients encoded into the structure and weights of the CNN.

Supervised learning may allow to distill priors about the OCT structure of specific samples into the CNN. The $\{I_N, I\}$ training dataset allows the CNN to discover the transformation function $f(I_N)\rightarrow I$, which would not be possible given only noisy or only clean samples. Dataset augmentation enables the CNN to learn invariants in regards to the transformation function, while keeping the number of $\{I_N, I\}$ or the number of necessary input images tractable. Finally, the use of a CNN allows (a) to find efficient high-parameter approximations off using stochastic gradient descent; (b) generalize from the training dataset to similar images of different subjects, acquired from different devices; (c) use modern GPU-acceleration to achieve near real-time performance.

The techniques disclosed herein have many advantages. In the following paragraphs some properties and possible advantages will be discussed in greater detail.

Acquisition time. In the case of retinal OCT, the technique may achieve SNR comparable to 20-50× averaging, depending on the sample and imaging device. In essence, this would allow a 20-50× reduction in acquisition time for the same image quality, or an increase in image quality for the same acquisition time.

Sample generalization. The inventors found that training on training data containing 2D B-scans of a particular sample location allows to denoise complete 3D C-scans of similar samples. For example, training on B-scans of the retina allows to denoise C-scans of any other retina.

Device generalization. The inventors have found that by training on samples of a specific device, it is possible to denoise images of samples created by other devices with similar characteristics (such as voxel size and resolution). Training on combined samples of multiple devices may help uncover additional information in the underlying OCT structure (e.g. adding samples from a device with better tissue penetration can improve the deep-tissue quality on a device with worse tissue penetration.)

Performance. Unlike previous iterative approaches, the neural network approach disclosed herein can denoise an image using a single "forward" pass through the CNN. Combined with widespread GPU acceleration, this allows to achieve near real-time performance on current systems.

Flexibility. Given an appropriate dataset, this approach can be used to denoise any kind of biological tissue (e.g. retina, cornea, skin, brain tissue, teeth, arteries/vessels or the colon) or non-biological samples (e.g. paint, metal structures, semi-conductors). Indeed, this technique can be applied not only to OCT but to any imaging modality that suffers from speckle noise (e.g. X-rays, computed tomography (CT), magnetic resonance imaging (MRI), ultrasound, or fluorescent/autofluorescent images).

Cost reduction. The techniques disclosed herein may allow to construct an OCT device that can outperform high-end clinical devices for a fraction of the cost.

Data compression. By removing speckle noise, it is possible to achieve a substantial reduction in storage space per acquired B-scan, even when using lossless compression. For example, the inventors were able to achieve a 3× greater compression ratio, when using lossless PNG compression.

In the following, an example training process will be disclosed in great detail. However, the details disclosed herein are only intended to aid in an understanding of the invention. They are not intended to limit the scope of the present disclosure. Also, the techniques will be explained in association with the specific application of OCT imaging. However, where OCT is mentioned, this may be alternatively replaced by another kind of imaging technique. In OCT terminology, an "A-scan" denotes a one-dimensional image representing features along a straight line of a laser beam. A "B-scan" denotes a two-dimensional image representing features in a plane or surface, obtained by scanning the laser beam along a certain path (which may be a straight line). A "C-scan" denotes a three-dimensional image obtained by scanning the laser beam in a two-dimensional pattern. FIG. 5(a) illustrates a B-scan, with the Y-axis indicating the direction along the light beam, and the X-direction indicating a scanning direction along a scanning surface. FIG. 5(b) illustrates how several tiles that are acquired in the y-direction can be composed to form a single B-scan. As shown in FIG. 5(b), tiling may be performed in several different ways. For example, as shown on the right hand side of FIG. 5(b) at number 1'), a tile may cover only part of the X-direction, but the whole extend of the original image in the Y-direction. As shown on the left-hand side of FIG. 5(b), the tiling may also be performed along both X-direction and Y-direction, for example to obtain four tiles 1), 2), 3), and 4) along the Y-direction. For example, square tiles may be made in this way. FIG. 5(c) illustrates a C-scan, in which the detector scans also the z-direction. Throughout this disclosure, where the input images, training images, and target images are discussed, such an image may be a tile of a larger image.

The training of the neural network involves creating a dataset comprising pairs $\{I_N, I\}$ of a noisy image $I_N$ and a clean image I of the same sample. In the case of OCT, these images can be B-scans, for example. We approximate the conceptual clean I B-scan as an average of a set of noisy $I_N$ B-scans of the same sample location.

To obtain appropriate sets of noisy images that can be averaged to obtain a high-quality averaged B-scan, several different techniques may be applied. Since standard commercial OCT devices can only provide either $I_N$ (single non-averaged B-scan) or I (single n-averaged B-scan, post-processed using device-specific proprietary algorithms) but not both at the same time, two alternative approaches are disclosed to acquire the data necessary to create the $\{I_N, I\}$ pairs:

As a first possibility, it is possible to use a custom OCT device that can provide both n-averaged I B-scans and the individual $I_N$ B-scans at the same time. For example, by acquiring 10 B-scans of the same sample location in fast repetition, ten $I_N$ B-scans are obtained that can be averaged to obtain a corresponding high quality I B-scan.

Alternatively, it is possible to acquire a dense non-averaged C-scan. In that case, each individual B-scan of the C-scan forms a noisy $I_N$ image and blocks of n-averaged B-scans of the C-scan form the clean I image. In this case n should preferably be low enough to avoid motion blur from averaging B-scans of different sample locations (for example, n is between 3 and 5).

Yet alternatively, it is possible to acquire highly-averaged B-scans as the clean I image and synthesize the noisy $I_N$ images using additive or multiplicative noise. While this allows basic despeckling to work, this method may produce qualitatively inferior results.

In order to train the network to provide noise reduction, the following steps may be performed.

1. Align the B-scans. An example method to align the B-scans is disclosed in Apostolopoulos et al. (i.e. flatten the retinal curvature and all B-scans using intensity-based registration).
2. After alignment, average sets of n images to construct the clean I samples.
   a. As a useful example, n=10 works well, when a dataset is available in which 10 B-scans depict the identical location.
   b. If the B-scans are extracted from a C-scan, as a useful example, n=5 works well as a compromise between averaged image quality and motion blur (since each individual B-scan depicts a different part of a bigger C-scan). In some applications, the C-scan dataset is so dense that n=5 equals to 0.0586 μm on the y-axis, which is reasonably motion- and artifact-free.
3. For each n-averaged ground truth, produce its complete collection of m=1 . . . n averaged noisy $I_N$ samples. For example, for a clean I sample with n=3, the complete collection of noisy $I_N$ samples comprises:
   a. 3× samples with m=1
   b. 3× samples with m=2
   c. 1× sample with m=3 (the 'ground truth' image)
   d. For a total of 6× $\{I_N, I\}$ pairs.
4. Augment the dataset. Note that each of the following augmentations are examples and are not necessary in all implementations. Moreover, other augmentations may be used besides the ones that are listed below.
   a. random horizontal flip (to be applied to both training image and target image).
   b. random gaussian noise (to be applied to the training image, not to the target image).
   c. random rayleigh noise (to be applied to the training image, not to the target image).
   d. random gaussian blur in the x- and z-axes (to be applied to the training image, not to the target image).
   e. random shifts and shear (to be applied to both training image and target image) may be applied for improved robustness.

5. The images may optionally be split up into tiles, as shown in FIG. 5(b). Tiling along the x-axis may lead to better training results and fewer artifacts than tiling along the z-axis (since z-tiles can sometimes contain pure noise, which causes artifacts). In certain embodiments, the tiling is such that the images are square, i.e. the number of pixels in each direction of a tile is equal or about the same.

Figure 6A:
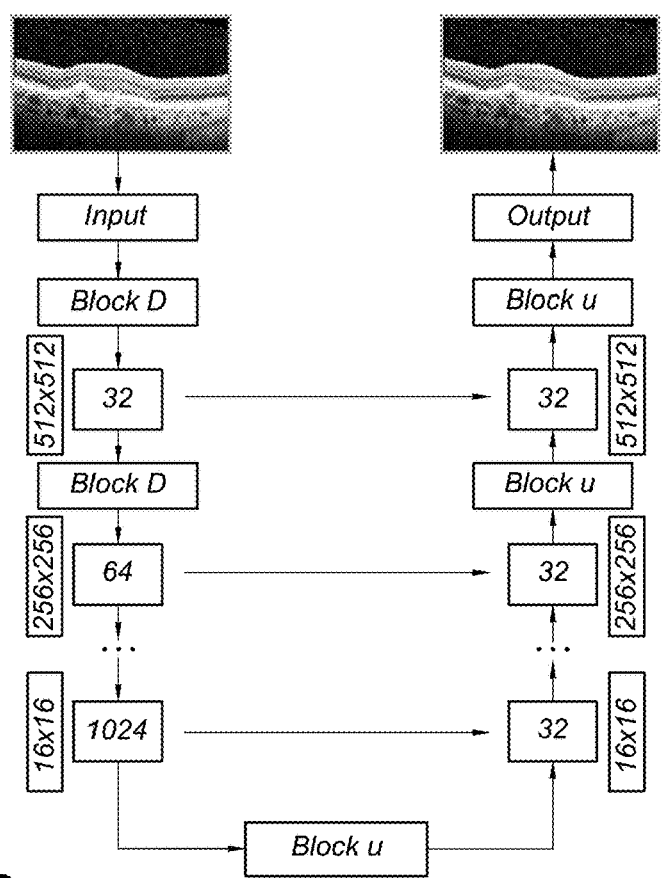
FIG. 6A shows a diagram of a structure of a U-shaped network ("U-net").
Figure 6B:
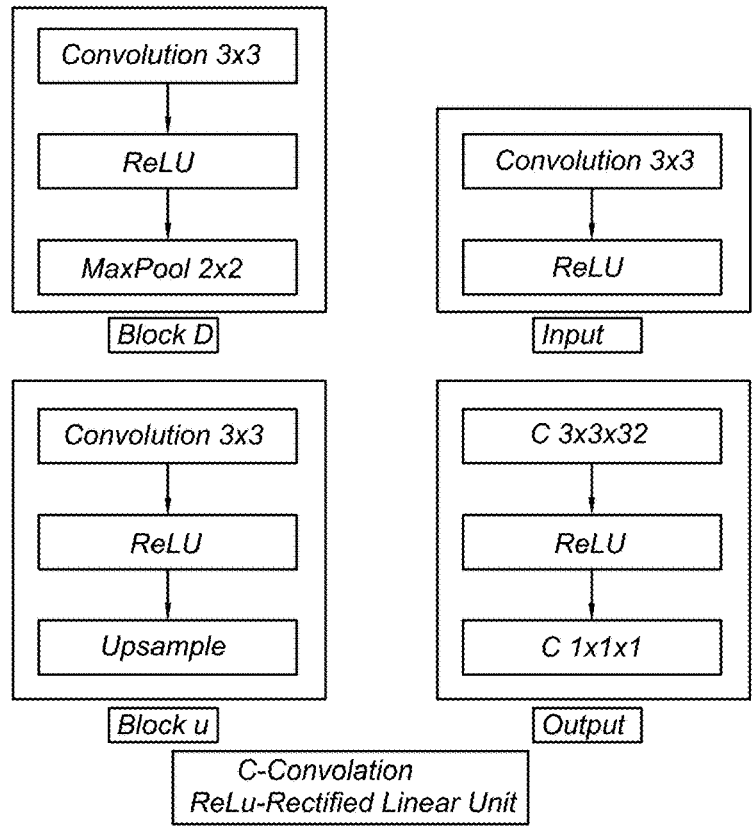
FIG. 6B shows a diagram illustrating the contents of the Input block, Output block, Block D, and Block u that appear in FIG. 6A.

As neural network, a convolutional neural network may be employed. For example, a U-shaped network ("U-net"). A deep U-shaped convolutional neural network for biomedical image segmentation is known from, for example, Ronneberger, O. et al., "U-Net: Convolutional Networks for Biomedical Image Segmentation," Medical Image Computing and Computer-Assisted Intervention (MICCAI), Springer, LNCS, Vol. 9351: 234-241, 2015. This kind of network may be adapted and trained with the datasets disclosed herein to create a noise reducing neural network. A diagram of a suitable example of a network architecture is shown in FIG. 6A. This architecture comprises convolutions, rectified linear units, pooling and upsampling layers. FIG. 6B shows example contents of the $Block_D$, $Block_U$, Input, and Output blocks that are used in the diagram of FIG. 6a. In other embodiments, other types and architectures of neural network may be used instead.

For example, if the images have N×M pixels, and each pixel has one intensity value associated with it, the neural network may have N×M input units and N×M output units, one input unit corresponding to each pixel value (of the training image) and one output unit corresponding to each pixel value (of the target image). When more pixel values are available for each pixel (for example different color channels), then more input units and output units may be provided in the neural network accordingly, one input unit for each pixel value in the image and one output unit for each pixel value in the output image of the neural network. To support images of different resolutions, a resampling step may be performed before or after applying the neural network, to adjust the desired resolution of the images to the number of available input/output units.

The techniques disclosed herein allow the neural network to learn the structure of the type of object at hand, for example the retina on different layers, and to reconstruct the missing information by inferring the most probable structure from the OCT speckle patterns. The result is a dramatic improvement in image quality and a near-complete elimination of speckle noise. In fact, this result is sometimes better than the equivalent N-averaged scan, due to the total absence of motion artifacts and blur.

Training on a single B-scan location appears to provide enough information to denoise the complete C-scan, even if it contains pathologies. However, it can be expected that adding ground truths with pathologies to the training set would improve the quality of the result.

Corrupting the training images with random amounts of Gaussian and Rayleigh noise appears to help significantly in the training process and the quality of the result (i.e. much smoother appearance with less noise).

Corrupting the training samples with Gaussian blur may lead to better-defined shapes in the result. It may also lead to a slightly blurrier overall image.

Using the m-averaged scans for many different values of m (with m<n) may enhance the image quality considerably.

Retraining may be useful to adapt the neural network to devices with greatly different imaging characteristics, in terms of resolution or histogram.

A neural network is both memory- and computation-heavy. Using the above configuration, training can be performed with a mini-batch size of, for example, 4, and may achieve an inference rate of ~2-4 B-scans/second on a Nvidia GeForce GTX 1080 (Nvidia, Santa Clara, Calif., US).

Network configurations with fewer levels or fewer parameters can be trained in mini-batches of, for example, 8 or 10 B-scans at a time, with a corresponding inference rate of ~8-16 B-scans/second.

The image quality achieved with a tile-based approach appears to be less than the quality obtained with whole-image processing. The reason appears to be the lack of larger context. When using whole images, the structures seen in the image can be related to each other by the neural network. For example, choroidal structures always appear below the retina. A good tile-based compromise appears to involve thin vertical tiles, covering the whole z-axis of the scan. This applies in particular to OCT and retina imaging, but extends to other OCT results in certain other types of materials and tissues.

A 3D-based approach may be used to improve the image quality of the reconstruction. This may include 3D convolutions or multi-channel 2D convolutions, which would combine multiple neighboring input B-scans into a single output. Indeed, using multiple channels improves image quality at a small memory cost. An example of this architecture would consist of a similar baseline structure to that presented in the example above, but increasing the convolutions (cony) to a 3rd dimension, including neighboring B-scans.

In the case of in-vivo imaging, naïve averaging may result in blurry images due to motion artifacts. Better results can be achieved by first aligning or registering each of the n B-scans between themselves (e.g. through cross-correlation or template matching) or to a common reference image. The latter can be achieved by imaging the fundus using an eye tracker, such as a Scanning Laser Ophthalmoscope (SLO) or a regular infrared camera, and using the detected eye motion to correct the placement of each B-scan.

FIG. 3 shows a comparison of several denoising methods. FIG. 3a shows the original image, with no denoising performed. FIG. 3b shows the image after noise reduction using wavelets. FIG. 3c shows the image after noise reduction using block-matching and 3D filtering (BM3D) method. FIG. 3d shows the image after noise reduction by 20× averaging. FIG. 3e shows the image after denoising using a method according to the present disclosure.

Figure 4:
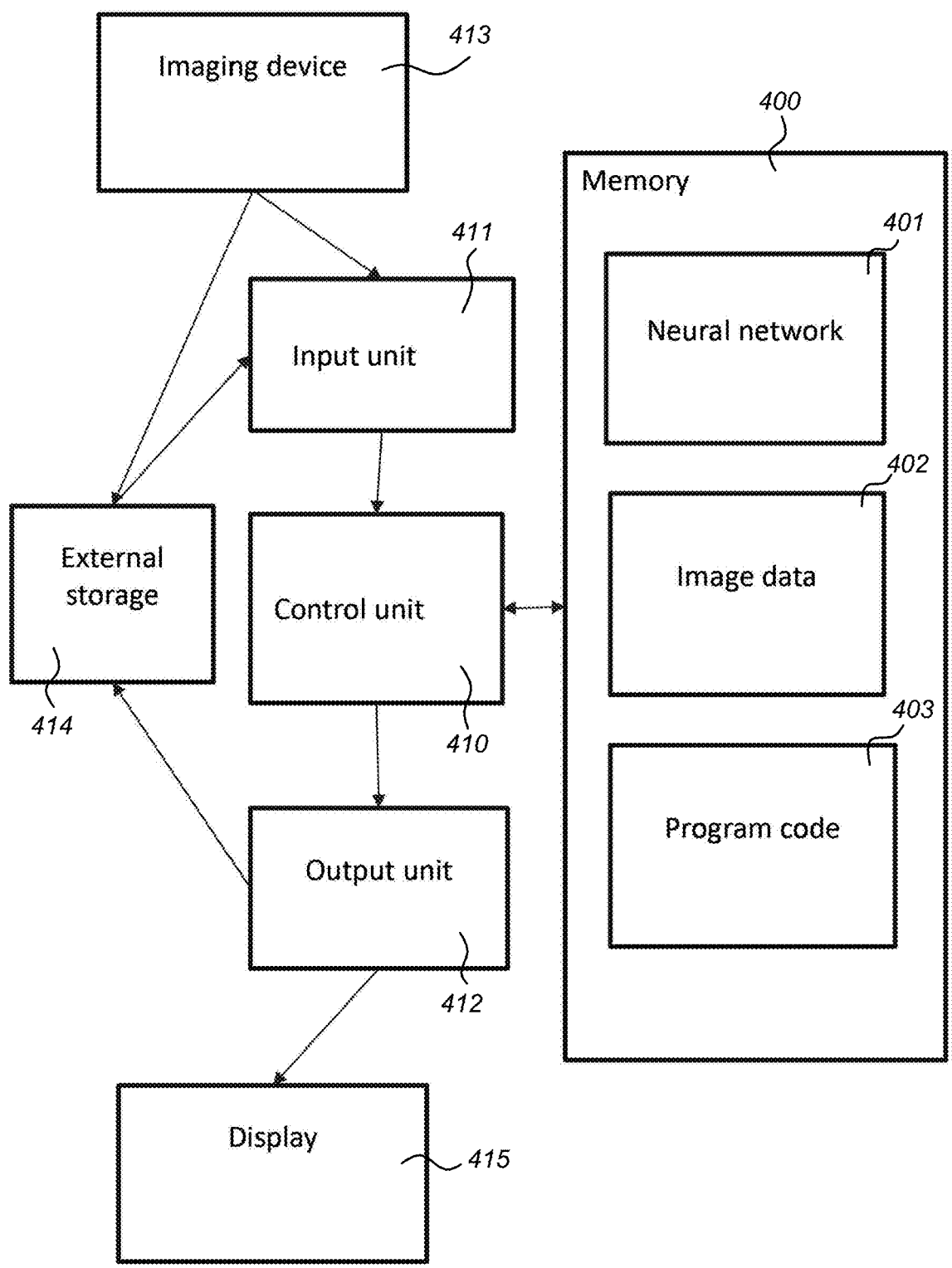
FIG. 4 shows a block diagram of a noise reduction apparatus.

FIG. 4 shows a block diagram of an imaging device, that can reduce noise using a neural network. The device comprises a memory 400. The memory 400 may comprise any kind of memory device or storage media, including volatile or non-volatile memory, or a combination of different types of memory. The memory 400 may comprise a definition of an artificial neural network, including the structure of the network and the parameters of the network. The parameters of the neural network may have been computed by means of a training procedure set forth elsewhere in this disclosure in greater detail. The training procedure may include obtaining a plurality of input images from an imaging device, identifying subsets of the input images, wherein each input image of a subset of input images depicts a same object as the other input images of that subset, generating a plurality of target images wherein a target image is generated by combining the input images of one of the subsets to reduce a noise, generating a plurality of training pairs wherein a training pair comprises one of the target images and a training image based on at least one but not all of the input images of the subset corresponding to said one of the target images, and training the neural network using the plurality of training pairs.

The memory 400 may further be used to store image data 402. These image data may be received via input unit 411 and stored in the memory 400 under control of the control unit 410. Also outputs of the neural network 401, such as denoised image data, may be stored in the memory 400.

The memory 400 may further store program code 403 to configure the control unit 410 to control certain tasks, such as handling input images received via the input unit 411, cause the neural network 401 to process image data, and outputting and storing the images outputted by the neural network.

The device may further comprise an input unit 411 to receive image data from an imaging device 413, possibly via an external data storage system 414. The input unit 411 may comprise for example a communications port for wired communication or a transceiver for wireless communications.

The device may further comprise an output unit 412 to output images to for example a display 415 or an external storage system 414. Similar to the input unit, the output unit may comprise a communication port and/or a wireless communication device. One piece of hardware may implement both the input unit and the output unit.

External storage system 414 may comprise a computer server configured for data storage and retrieval, for example organized in patient files.

Display 415 may comprise any display device, such as a computer monitor, or may alternatively comprise a workstation including a computer and a monitor.

Imaging device 413 comprises a sensor configured to perform certain measurements. Examples of suitable imaging devices are an optical coherence tomography (OCT) scanner, a computed tomography scanner, or a magnetic resonance imaging scanner. The imaging device 413 may comprise a reconstruction unit for reconstructing the image data into a spatial or spatiotemporal domain. The imaging device may be configured to output the reconstructed image data to the external storage system 414 or directly to the input unit 411.

The control unit 410 may be any programmable processor or controller, capable of controlling the components of the system and executing the computer code 403 stored in the memory 400, to implement the functions disclosed herein. The control unit 410 may be programmed by the program code 403, to perform the training of the neural network 401, or after training, to process new image data by applying the trained neural network 401.

Other embodiments, such as cloud-based implementations, are also possible.

Some or all aspects of the invention are suitable for being implemented in form of software, in particular a computer program product. For example, the steps involved in processing the subsets of images to generate the training dataset are suitable for being implemented in a computer program. Also the training process of the neural network may be performed by a computer program. Similarly, the application of the neural network to new images may be performed by a computer program. The computer program product may comprise a computer program stored on a non-transitory computer-readable media. Also, the computer program may be represented by a signal, such as an optic signal or an electro-magnetic signal, carried by a transmission medium such as an optic fiber cable or the air. The computer program may partly or entirely have the form of source code, object code, or pseudo code, suitable for being executed by a computer system. For example, the code may be executable by a control unit, which may comprise one or more processors or controllers.

The examples and embodiments described herein serve to illustrate rather than limit the invention. The person skilled in the art will be able to design alternative embodiments without departing from the spirit and scope of the present disclosure, as defined by the appended claims and their equivalents. Reference signs placed in parentheses in the claims shall not be interpreted to limit the scope of the claims. Items described as separate entities in the claims or the description may be implemented as a single hardware or software item combining the features of the items described.

Examples are disclosed in the following clauses.

1. A method of training a neural network for reducing noise in an image, comprising
obtaining (101) a plurality of input images from an imaging device;
identifying (101a) subsets of the input images, wherein each input image of a subset of input images depicts a same object as the other input images of that subset;
generating (104) a plurality of target images, wherein a target image is generated by combining the input images of one of the subsets, to reduce a noise;
generating (105) a plurality of training pairs, wherein a training pair comprises
one of the target images, and
a training image based on at least one but not all of the input images of the subset corresponding to said one of the target images; and training (107) a neural network using the plurality of training pairs.

2. The method of clause 1, further comprising, if the training image is based on more than one input image, generating the training image by combining said more than one but not all of the input images of the subset of input images to reduce noise of the training image.

3. The method of clause 2, wherein the plurality of training pairs comprises a first training pair comprising a first training image that is based on a first number $K_1$ of input images, and a second training pair comprising a second training image that is based on a second number $K_2$ of input images, wherein the first number $K_1$ is different from the second number $K_2$.

4. The method of clause 3, wherein the plurality of training pairs comprise training pairs having the same target image but different training images that are based on different numbers of input images.

5. The method of any preceding clause, wherein, for each target image and its corresponding subset of N input images, training images are generated based on K of the subset of N input images, for all positive integer values K that are smaller than N.

6. The method of any preceding clause, wherein for any value K, if there exist more than one possible selection of K input images from the subset of N input images, then training images are generated for more than one selection of the K input images from the subset of N input images.

7. The method of any preceding clause,
wherein the combining of the input images comprises averaging corresponding values of the combined input images, or
further comprising spatially registering the input images of a subset before generating the target image and training images, or further comprising augmenting the training images by adding noise or changing an orientation of the training image before training the neural network.

8. The method of any preceding clause, wherein the input images are obtained by means of optical coherence tomography, OCT.

9. The method of clause 8, wherein the input images of a particular subset of input images comprise a plurality of B-scan images extracted from a single C-scan image.

10. The method of any preceding clause, wherein the input images depict at least part of a retina.

11. The method of any preceding clause, wherein the input images of different subsets comprise images of a same type of tissue or a same type of organ in different subjects, or wherein the input images of different subsets comprise images of different objects of a same type.

12. The method of any preceding clause, wherein the obtaining the plurality of input images comprises obtaining input images from a plurality of different imaging devices.

13. The method of any preceding clause, further comprising, after the training, receiving a new image from an imaging device and supplying (108) the new image as input image to the neural network and obtaining an output image from the neural network.

14. A noise reduction apparatus of an imaging device, comprising
an input unit (411) for receiving an image from an imaging device;
a control unit (410) for processing the image according to a trained neural network (401) to generate an output image; and
the neural network (401) created by obtaining a plurality of input images from an imaging device, identifying subsets of the input images, wherein each input image of a subset of input images depicts a same object as the other input images of that subset, generating a plurality of target images wherein a target image is generated by combining the input images of one of the subsets to reduce a noise, generating a plurality of training pairs wherein a training pair comprises one of the target images and a training image based on at least one but not all of the input images of the subset corresponding to said one of the target images, and training the neural network using the plurality of training pairs.

15. A system for training a neural network for reducing noise in an image, comprising
an input unit (411) for obtaining a plurality of input images from an imaging device;
a control unit (410) configured to:
identify (101a) subsets of the input images, wherein each input image of a subset of input images depicts a same object as the other input images of that subset;
generate (104) a plurality of target images, wherein a target image is generated by combining the input images of one of the subsets, to reduce a noise;
generate (105) a plurality of training pairs, wherein a training pair comprises
one of the target images, and
a training image based on at least one but not all of the input images of the subset corresponding to said one of the target images; and train (107) a neural network (401) using the plurality of training pairs.

The invention claimed is:

1. A method of training a neural network for reducing noise in an image, comprising
obtaining a plurality of input images from an imaging device;
identifying subsets of the input images, wherein each input image of a subset of input images depicts a same object as the other input images of that subset;
generating a plurality of target images, wherein a target image is generated by combining the input images of one of the subsets, to reduce a noise;
generating a plurality of training pairs, wherein a training pair comprises
one of the target images, and
a training image based on at least one but not all of the input images of the subset corresponding to said one of the target images, wherein when the training image is based on more than one input image, generating the training image by combining said more than one but not all of the input images of the subset of input images to reduce noise of the training image; and
training a neural network using the plurality of training pairs, wherein an input to the neural network comprises the training image of a certain training pair of the plurality of training pairs, and a target output of the neural network comprises the target image of the certain training pair,
wherein the plurality of training pairs comprises a first training pair comprising a first training image that is based on a first positive integer number $K_1$ of input images, and a second training pair comprising a second training image that is based on a second positive integer number $K_2$ of input images, wherein the first positive integer number $K_1$ is different from the second positive integer number $K_2$, wherein the plurality of training pairs comprise training pairs having the same target image but different training images that are based on different numbers of input images.

2. The method of claim 1, wherein, for each target image and its corresponding subset of N input images, wherein N is a positive integer, training images are generated based on $K_3$ of the subset of N input images, for all positive integer values $K_3$ that are smaller than N.

3. The method of claim 1, wherein for any value $K_4$, if there exist more than one possible selection of $K_4$ input images from the subset of N input images, wherein N is a positive integer, then training images are generated for more than one selection of the $K_4$ input images from the subset of N input images.

4. The method of claim 1,
wherein the combining of the input images comprises averaging corresponding values of the combined input images, or
further comprising spatially registering the input images of a subset before generating the target image and training images, or
further comprising augmenting the training images by adding noise or changing an orientation of the training image before training the neural network.

5. The method of claim 1, wherein the input images are obtained by means of Optical Coherence Tomography (OCT).

6. The method of claim 5, wherein the input images of a particular subset of input images comprise a plurality of B-scan images extracted from a single C-scan image.

7. The method of claim 1, wherein the input images depict at least part of a retina.

8. The method of claim 1, wherein the input images of different subsets comprise images of a same type of tissue or a same type of organ in different subjects, or wherein the input images of different subsets comprise images of different objects of a same type.

9. The method of claim 1, wherein the obtaining the plurality of input images comprises obtaining input images from a plurality of different imaging devices.

10. The method of claim 1, further comprising, after the training, receiving a new image from an imaging device and supplying the new image as input image to the neural network and obtaining an output image from the neural network.

11. A noise reduction apparatus of an imaging device, comprising
an input unit for receiving an image from an imaging device; a control unit for processing the image according to a trained neural network to generate an output image; and
the neural network created by obtaining a plurality of input images from an imaging device, identifying subsets of the input images, wherein each input image of a subset of input images depicts a same object as the other input images of that subset, generating a plurality of target images wherein a target image is generated by combining the input images of one of the subsets to reduce a noise, generating a plurality of training pairs wherein a training pair comprises one of the target images and a training image based on at least one but not all of the input images of the subset corresponding to said one of the target images, wherein when the training image is based on more than one input image, generating the training image by combining said more than one but not all of the input images of the subset of input images to reduce noise of the training image, and training the neural network using the plurality of training pairs, wherein an input to the neural network comprises the training image of a certain training pair of the plurality of training pairs and a target output of the neural network comprises the target image of the certain training pair,
wherein the plurality of training pairs comprises a first training pair comprising a first training image that is based on a first positive integer number $K_1$ of input images, and a second training pair comprising a second training image that is based on a second positive integer number $K_2$ of input images, wherein the first positive integer number $K_1$ is different from the second positive integer number $K_2$, wherein the plurality of training pairs comprise training pairs having the same target image but different training images that are based on different numbers of input images.

12. A system for training a neural network for reducing noise in an image, comprising
an input unit for obtaining a plurality of input images from an imaging device;
a control unit configured to:
identify subsets of the input images, wherein each input image of a subset of input images depicts a same object as the other input images of that subset;
generate a plurality of target images, wherein a target image is generated by combining the input images of one of the subsets, to reduce a noise;
generate a plurality of training pairs, wherein a training pair comprises
one of the target images, and
a training image based on at least one but not all of the input images of the subset corresponding to said one of the target images, wherein when the training image is based on more than one input image, generate the training image by combining said more than one but not all of the input images of the subset of input images to reduce noise of the training image; and
train a neural network using the plurality of training pairs, wherein an input to the neural network comprises the training image of a certain training pair of the plurality of training pairs, and a target output of the neural network comprises the target image of the certain training pair,
wherein the plurality of training pairs comprises a first training pair comprising a first training image that is based on a first positive integer number $K_1$ of input images, and a second training pair comprising a second training image that is based on a second positive integer number $K_2$ of input images, wherein the first positive integer number $K_1$ is different from the second positive integer number $K_2$, wherein the plurality of training pairs comprise training pairs having the same target image but different training images that are based on different numbers of input images.

* * * * *